United States Patent [19]

Asphahani et al.

[11] Patent Number: 4,846,885
[45] Date of Patent: Jul. 11, 1989

[54] HIGH MOLYBDENUM NICKEL-BASE ALLOY

[75] Inventors: Aziz Asphahani, Kokomo; Steven J. Matthews, Greentown, both of Ind.

[73] Assignee: Haynes International, Inc., Kokomo, Ind.

[21] Appl. No.: 125,895

[22] Filed: Nov. 27, 1987

[51] Int. Cl.$^4$ .............................................. C22C 19/03
[52] U.S. Cl. .................................. 75/246; 75/245; 420/429; 420/441; 420/450; 420/453; 219/146.23
[58] Field of Search ................. 75/246, 245; 420/429, 420/441, 443, 446, 447, 448, 449, 450, 451, 452, 453, 457, 458, 459, 460; 219/146.22, 146.23, 146.41, 146.24, 146.3

[56] References Cited

U.S. PATENT DOCUMENTS

| Re. 26,855 | 4/1970 | Yasuda et al. | 75/245 |
| 1,807,581 | 6/1931 | Bates | 75/245 |
| 2,698,786 | 1/1955 | Jones et al. | 420/429 |
| 2,959,480 | 11/1960 | Flint | 420/441 |
| 3,319,134 | 5/1967 | Csakvary | 75/245 |
| 3,350,294 | 10/1967 | Hall et al. | 420/441 |
| 3,639,647 | 2/1972 | Kehl et al. | 420/441 |
| 3,649,255 | 3/1972 | Ecer | 420/441 |
| 3,655,365 | 4/1972 | Holtz et al. | 75/245 |
| 3,929,424 | 12/1975 | Krock et al. | 75/245 |
| 4,381,944 | 5/1983 | Smith, Jr. et al. | 75/246 |
| 4,608,317 | 8/1986 | Kobayashi et al. | 75/246 |

FOREIGN PATENT DOCUMENTS

| 3530837 | 3/1987 | Fed. Rep. of Germany | 219/146.23 |
| 2512068 | 3/1983 | France | 420/441 |
| 56-10980 | 3/1981 | Japan | 75/246 |
| 58-161746 | 9/1983 | Japan | 420/441 |
| 602588 | 4/1978 | U.S.S.R. | 420/429 |
| 971905 | 11/1982 | U.S.S.R. | 420/429 |
| 542851 | 1/1942 | United Kingdom | 420/441 |
| 1447518 | 8/1976 | United Kingdom | 420/429 |

OTHER PUBLICATIONS

Henderson et al., *Metallurgical Dictionary*, 1953, pp. 287–288.

Primary Examiner—Stephen J. Lechert, Jr.
Assistant Examiner—Eric Jorgensen
Attorney, Agent, or Firm—Joseph J. Phillips

[57] ABSTRACT

Disclosed is a nickel-base alloy eminently suited for use as a welding filler material. The alloy contains over 40% molybdenum with an effective content of silicon to provide a valuable combination of engineering properties which includes the combination of high strength, excellent corrosion resistance and welding characteristics. Commercial production of the alloy may be in many forms, for example, castings, powder metallurgy articles, wrought products and the like. A typical alloy of this invention contains about 42% molybdenum, 0.25% silicon and the balance nickel plus modifying elements and impurities.

9 Claims, 1 Drawing Sheet

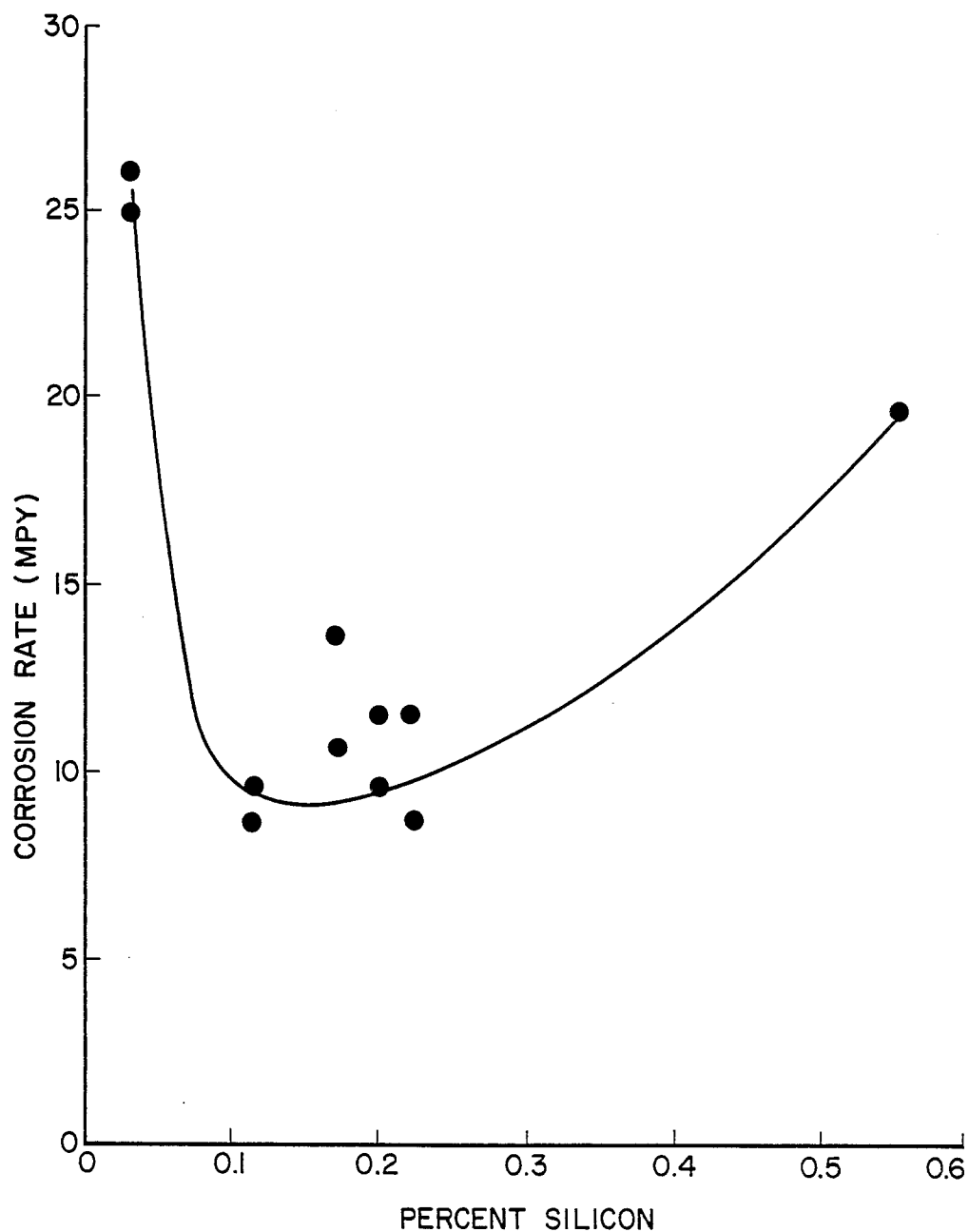

HIGH MOLYBDENUM NICKEL-BASE ALLOY

INTRODUCTION

This invention relates to a nickel-molybdenum base alloy and, more specifically, to a novel alloy with effective contents of certain elements to provide new and useful engineering properties.

BACKGROUND AND PRIOR ART

Nickel-molybdenum alloys been known, for about sixty years, for use as wet corrosion-resistant articles, thermionic valves, high-temperature resistant articles and other engineering uses. These alloys have been available generally in the form of castings, wrought products, and as materials for use in welding and weld overlaying.

The best known commercial products are alloy B and alloy B-2 produced by Haynes International, Inc. under their registered trademark HASTELLOY. Alloy B nominally contains about 28% molybdenum, about 5% iron, about 0.30% vanadium, up to 2.5% cobalt, less than 1% silicon and the balance nickel plus impurities. Alloy B-2 nominally contains about 28% molybdenum, less than 2% iron, less than 1.0% cobalt, less than 0.1% silicon and the balance nickel plus impurities.

Also known in the art is HASTELLOY ® alloy W which is especially suited for use as wellding wire for dissimilar alloys. Alloy W nominally contains about 24% molybdenum, about 5% iron, about 5% chromium, up to 0.60% vanadium and the balance nickel plus impurities.

U.S. Pat. Nos. 1,375,082 and 1,375,083 disclose nickel-molybdenum alloys, respectively, with and without manganese additions. The molybdenum content varies from a preferred 10% up to a maximum of 20%. U.S. Pat. No. 1,710,445 discloses an alloy system containing essentially molybdenum 15 to 40%, iron 10 to 40%, balance nickel plus modifying elements. U.S. Pat. No. 2,196,699 discloses a nickel-base alloy containing up to about 25% molybdenum plus antimony and other elements. U.S. Pat. No. 2,207,380 discloses a nickel-base alloy containing 18 to 40% molybdenum plus essential contents of manganese and silver. U.S. Pat. No. 2,315,497 discloses a nickel-molybdenum-iron alloy containing 10 to 40% molybdenum and 4 to 25% iron with critical lower limits of copper content. U.S. Pat. No. 2,109,285 discloses a 28-40% molybdenum nickel alloy with total silicon and carbon at less than 0.15% as impurities. U.S. Pat. Nos. 2,404,247 and 2,404,308 relate to nickel-base alloys containing 15 to 25% molybdenum plus required titanium, selenium and manganese.

The alloys of the prior art have found many valuable uses especially in exposure to wet corrosion conditions. Alloys containing nickel and molybdenum have been used also in the production of welding materials; for example: metal powders, cast rod, and welding wire. These alloys are especially useful as structural materials and weldments in the construction of vessels and plumbing handling acids, i.e., hot hydrochloric acid and the like. There is a constant need in the art for improved alloys of this class to reduce costs in long term use of articles and apparatus (such as vessels and plumbing) in a variety of acids and at higher temperatures.

As used herein the term, "structural material," shall mean a component of a manufactured article - for example, the hub as a component of a wheel. The term "weldment" shall mean "an assembly whose component parts are joined by welding."

In industrial use, there are many variables in acids and acid concentrations, temperatures and times at temperature and other factors that affect the alloy. Some of these factors may be oxidizing or reducing atmospheres, need for hardness or need for ductility, exposure to extreme heat or cold. Because of this, there can be no one perfectly ideal alloy for all industrial uses. There is a constant need in the art for improved alloys of this class, that provide a valuable combination of characteristics for many industrial uses.

The molybdenum rich nickel alloys of this class are especially resistant to reducing acids, i.e., hydrochloric and sulfuric acids.

The failure mechanism in fabricated components of these alloys appears most frequently in the weld and is attributable to the segregation of molybdenum. This results in the difference in molybdenum contents between dentrities and interdentritic regions. Increased dissolution and/or corrosion is found in the molybdenum lean phase.

Generally, it is expected that a homogenization heat treatment (such as anneal or cold work plus anneal) should reduce the tendency to such failures. However, experimental tests have shown that in some cases a homogenization treatment actually results in a higher corrosion rate in hydrochloric and sulfuric acids.

In a series of tests, prior art alloy B-2 was tested under several conditions in an effort to reduce such failures. Table 1 shows results of the testing. In Table 1, Condition A was as-welded (gas tungsten arc). Conditions B, C and D were as-welded plus 30% cold reduction. Finally, Condition B was annealed at 1066° C. for about 15 minutes, then water quenched; Condition C was annealed at 1121° C. for about 15 minutes, then water quenched; and Condition D was annealed at 1149° C. for about 15 minutes, then water quenched.

The data in Table 1 clearly show a homogenization heat treatment after welding does not improve prior art alloy B-2, which contains about 28% molybdenum.

OBJECTS OF THIS INVENTION

It is a principal object of this invention to provide an alloy that has a valuable combination of properties.

It is another principal object of this invention to provide an alloy especially suitable for welding processes as a weldment or a welded component in corrosion service.

These and other objectives and advantages may be discerned by those skilled in the art after a review of the following description and examples of this invention.

TABLE 1

EFFECT OF POST-WELD TREATMENT
ON CORROSION RESISTANCE
OF HASTELLOY ALLOY B-2

| Condition | Corrosion Rate (mpy) | | |
|---|---|---|---|
| | 20% HCl Boiling | 60% $H_2SO_4$ + 8% HCl Boiling | 50% $H_3PO_4$ + 30% $H_2SO_4$ Boiling |
| A | 14 | 29 | 17 |
| B | 16 | 59 | 35 |
| C | 23 | 68 | 31 |
| D | 23 | 51 | 27 |

BRIEF DESCRIPTION OF THE DRAWINGS

The FIGURE graphically presents corrosion data on the effect of silicon in the alloy of this invention.

BRIEF DESCRIPTION OF THIS INVENTION

The alloy, as disclosed in Table 2, describes the alloy of this invention. In the metallurgical arts, it is well known that commercial metal alloys contain many modifying elements, optional elements and impurities which may be harmful, beneficial or innocuous. In some cases, an impurity may be beneficial or harmful depending upon its level of content or if it is in combination with another element.

In the alloy of this invention, certain elements may be deliberately added to modify certain characteristics, as is well known in the art. Iron up to 20% and the total manganese, tungsten, copper, chromium, tantalum and niobium may be present up to about 20%.

Other elements may be present as deliberate modifying elements or as a result of processing steps (for example deoxidation). The elements aluminum, magnesium, calcium, titanium and zirconium may be present up to about 10%. Of course, in some cases certain elements may be both modifying elements and processing elements, for example, aluminum and manganese.

The alloy, as described in Table 2, may be produced in the form of castings, powder metal products, metal powder, welding filler material and other commercial forms with proper processing, such as wire, bar, plate, tube, pipe, billet and forgings.

was the most successful process. All test results were obtained from alloys produced by aspiration casting.

The alloy of this invention was also produced by a "pliable" powder process. In this process, the alloy metal powder is combined into a pliable mixture containing binders, plasticizers, and other modifying vehicles as required. The pliable mixture is then fashioned into a weld wire shape by extrusion through a die. The shaped product is then dried, debindered and sintered to produce a material suitable for welding.

Alloys of this invention also may be produced by conventional rod casting processes, both batch and continuous, and other known processes that produce coated electrodes and flux cored electrodes and the like.

In order to demonstrate the superior corrosion resistance of the alloy of this invention versus the prior art alloy, especially as a weld deposit, the following experiment was performed. Welding rods of alloy E (Table 2) were used to butt-weld ¼-inch thick alloy B-2 plate prepared using a 70° included angle-single vee groove with a ⅛-inch root opening.

A second weldment was made using alloy B-2 as the initial root pass. The cover deposit was made in 2 passes using alloy E. A third weldment was made using alloy B-2 filler wire to fill the entire groove. This was done to allow a direct comparison for corrosion testing.

The three weldments were sectioned into corrosion test coupons. The coupons were tested in an autoclave containing 20% HCl at 149° C. for 96 hours. The following corrosion rates were measured (mpy):

TABLE 2

ALLOY OF THIS INVENTION
COMPOSITION IN WEIGHT PERCENT

| ELEMENT | BROAD RANGE | PREFERRED RANGE | TYPICAL ALLOYS | | | |
|---|---|---|---|---|---|---|
| | | | A | I | F | E |
| MO | 40 TO 60 | 40 TO 44 | 41.62 | 43.0 | 43.34 | 43.52 |
| SI | .01 TO .65 | .07 TO .65 | .02 | .11 | .22 | .57 |
| FE | UP TO 20 | UP TO 15 | UP TO 15 | UP TO 15 | UP TO 15 | UP TO 15 |
| TOTAL MN, W, CU, CR, TA, NB | UP TO 20 | UP TO 15 | UP TO 15 | UP TO 15 | UP TO 15 | UP TO 15 |
| TOTAL AL, MG, CA, TI, ZR | UP TO 10 | UP TO 5 | UP TO 5 | UP TO 5 | UP TO 5 | UP TO 5 |
| NI PLUS IMPURITIES | BALANCE | BALANCE | BALANCE | BALANCE | BALANCE | BALANCE |

EXPERIMENTAL DATA AND EXAMPLES

The alloy of this invention was experimentally produced by a number of processes. At stated earlier, there is difficulty in producing high molybdenum-nickel alloys. Several processes resulted in at least a modicum of success; for example, ingots produced by vacuum induction melting, then electro-slag remelting did not prove to be very successful.

Metal wires of various compositions of molybdenum and nickel can be twisted (i.e. wire cable) to form a composite filler material. The "twist wire" is melted by a Gas Tungsten Arc Welding Torch to produce the desired composition in the resulting weld deposit. As a variation, a composite was made by tack welding straight pieces of wire together. The "tack welding" method was successful in providing a deposit; but undissolved molybdenum was found in the deposit.

The alloy of this invention was produced by the well known aspiration casting process. Aspiration casting is a well known process for the production of weld rods. Simply stated, metal is cast into an expendable mold (glass tube) with the use of vacuum to fill the mold. This

| Weld Deposit | |
|---|---|
| All Alloy E | 40.6 |
| Alloy E fill passes Alloy B-2 root pass | 45.6 |
| All Alloy B-2 | 64.9 |

The results show the superiority of the high molybdenum alloy over alloy B-2 in terms of corrosion resistance in 20% HCl. The improved corrosion resistance was further discerned by both metallographic cross-section of the weld deposits and by scanning electron microscopy of the corrosion tested coupons, for example, scanning electron microscopy of the end of the tested autoclave coupon prepared from a weldment made with an alloy B-2 root pass showed that alloy B-2 was visibly attacked while the high molybdenum fill pass above it still showed the original speciment preparation grind marks and no sign of corrosion attack.

A series of tests were completed to study the effects of silicon in the alloy. The experiment alloys essentially contained 41.5 to 43.5% molybdenum and the balance nickel, with the silicon contents as tabulated in Table 3. Fluidity was determined by observation of the welding operator while making deposits of the alloys. The propensity to cracking was determined by microscopic examination of the welded samples.

The data in Table 3 show that silicon at levels of 0.11 and 0.22% are most beneficial to the alloy, while much lower and higher contents may be harmful to the product, when both fluidity and resistance to cracking are required.

In another series of tests, six alloys were also tested to study the effects of silicon on corrosion resistance. The data are given in Table 4 and are graphically presented in the figure. These data clearly show that silicon is essential in the alloy and the range of content is especially critical.

TABLE 3

EFFECT OF SILICON CONTENT ON FLUIDITY AND RESISTANCE TO CRACKING

| Alloy | % Silicon | Metal Fluidity | Weld Cracking | Corrosion Resistance |
|---|---|---|---|---|
| A | 0.02 | Poor | None | Poor |
| I | 0.11 | Good | None | Good |
| F | 0.22 | Excellent | None | Good |
| E | 0.57 | Best | Cracking | Poor |

Composition balance about 42% molybdenum and nickel plus impurities.

TABLE 4

EFFECT OF SILICON ON CORROSION RATE IN 20% HYDROCHLORIC ACID AT 149° C. FOR 196 HOURS

| Alloy | % Silicon | Corrosion rates | |
|---|---|---|---|
| | | Test 1 | Test 2 |
| A | .02 | 24.9 | 26 |
| I | .11 | 8.8 | 9.5 |
| H | .17 | 13.7 | 10.7 |
| G | .20 | 9.7 | 11.6 |
| F | .22 | 8.6 | 11.6 |
| E | .57 | 19.1 | 19.9 |

Composition balance about 42% molybdenum and nickel plus impurities.

The experimental alloys were tested in 20% hydrochloric acid at 149° C. for 96 hours. The corrosion rates are reported in mils per year (mpy).

The experimental data show that molybdenum contents must be over 40% and less than 60% with the preferred at about 40 to 44%. Contents of silicon may be as low as 0.01% and up to 0.65%. The preferred contents are 0.07 to 0.65 and the optimum contents are about 0.15 to 0.65. These ranges have been established in a manner to include a variety of possible uses for the alloy. Contents of molybdenum and silicon must vary depending upon the required properties in the use of an end product. For example, where fluidity is required, a higher content of silicon is desirable. However, where resisting to a cracking is required, a lower content of silicon is required. These adjustments may be made by people skilled in the art.

As indicated earlier, the alloy of this invention may be provided in many forms: castings, welding filler metal, wrought products, powder metal articles and others. For example, while it may be difficult to obtain wrought products by ingot forging and rolling means, it is possible to obtain near shape products by powder metallurgy processes, then final work in a manner to fashion a final product.

As mentioned earlier in this specification, poor corrosion resistance appears to be caused by the difference in molybdenum content between dentrites and interdentritic regions. Metallographic examination of the prior art alloys revealed molybdenum-lean phases. A homogenization heat treatment did not solve the problem as shown in Table 1.

Metallographic examination of the alloys of this invention did not reveal similar molybdenum-lean phases. The exact mechanism that provides the benefits of this invention is not completely understood. The combined elements of over 40% molybdenum, and an effective amount of silicon in a nickel base, somehow yields the improved alloy system.

In the foregoing specification, there has been set out certain preferred embodiments of this invention, however, it will be understood that this invention may be otherwise embodied within the scope of the following claims.

What is claimed is:

1. An alloy consisting essentially of, in percent by weight, 40 to 60 molybdenum, 0.01 to 0.65 silicon, up to 20 iron, total manganese, tungsten, copper, chromium, tantalum and niobium up to 20, total aluminum, magnesium, calcium, titanium, and zirconium up to 10 and the balance nickel plus normal impurities wherein the critical silicon content provides the combination of engineering properties required for use in the form of structural materials and weldments.

2. The alloy of claim 1 containing 40 to 44 molybdenum, 0.07 to 0.65 silicon, up to 15 iron, up to 15 total manganese, tungsten, copper, chromium, tantalum, niobium, and up to 5 total aluminum, magnesium, calcium, titanium and zirconium.

3. The alloy of claim 1 containing 0.15 to 0.65 silicon.

4. The alloy of claim 1 containing about 41.5 molybdenum and about 0.02 silicon.

5. The alloy of claim 1 containing about 43 molybdenum and about 0.11 silicon.

6. The alloy of claim 1 containing about 43 molybdenum and about 0.22 silicon.

7. The alloy of claim 1 containing about 44 molybdenum and about 0.57 silicon.

8. The alloy of claim 1 produced by casting or powder metallurgy.

9. The alloy of claim 1 in the form of welding filler material.

* * * * *